(12) United States Patent
Nemura

(10) Patent No.: US 12,711,342 B2
(45) Date of Patent: Aug. 18, 2026

(54) MEDIA PROCESSING DEVICE WITH MULTI-FORMAT SUPPORT

(71) Applicant: ZEBRA TECHNOLOGIES CORPORATION, Lincolnshire, IL (US)

(72) Inventor: Blake E. Nemura, Saint Charles, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 374 days.

(21) Appl. No.: 18/385,514

(22) Filed: Oct. 31, 2023

(65) Prior Publication Data

US 2025/0139396 A1 May 1, 2025

(51) Int. Cl.
*G06K 15/02* (2006.01)

(52) U.S. Cl.
CPC ......... *G06K 15/181* (2013.01); *G06K 15/028* (2013.01); *G06K 15/1831* (2013.01)

(58) Field of Classification Search
USPC ........................................................ 358/1.15
See application file for complete search history.

(56) References Cited

U.S. PATENT DOCUMENTS

2005/0206917 A1* 9/2005 Ferlitsch ............ G06K 15/1848 358/1.15
2015/0186759 A1* 7/2015 Braun .................. G06F 3/1248 358/1.18

* cited by examiner

*Primary Examiner* — Jacky X Zheng

(57) ABSTRACT

Media processing methods and devices with multi-format support are provided herein. An example method includes receiving a first document at a thermal printer, determining the first document has a first format from a plurality of possible formats, selecting, based upon the first format, a first interpreter from a plurality of interpreters, the first interpreter configured to render the first document for printing, receiving a second document at the thermal printer, determining the second document has a second format of the plurality of possible formats, selecting, based upon the second format, a second interpreter from the plurality of possible interpreters, the second interpreter configured to render the second document for printing, and printing the first document and the second document.

19 Claims, 7 Drawing Sheets

MEDIA PROCESSING DEVICE WITH MULTI-FORMAT SUPPORT

BACKGROUND

An interpreter renders documents of a predetermined format or compatible formats for use by a media processing device, such as for printing by a thermal printer. As such, the capabilities of a media processing device can be limited by the interpreter, such that the media processing device may be incapable of printing documents that are incompatible with the interpreter of the media processing device.

SUMMARY

Methods, systems, and devices are provided for receiving and rendering documents in a plurality of predetermined formats.

In an example embodiment, a method is disclosed that comprises receiving a first document at a thermal printer, determining the first document has a first format from a plurality of possible formats, selecting, based upon the first format, a first interpreter from a plurality of interpreters, the first interpreter configured to render the first document for printing, receiving a second document at the thermal printer, determining the second document has a second format of the plurality of possible formats, selecting, based upon the second format, a second interpreter from the plurality of possible interpreters, the second interpreter configured to render the second document for printing, and printing the first document and the second document.

In a variation of this example embodiment, the determining is based at least in part upon which of a plurality of ports of the thermal printer receives the first document and the second document, respectively.

In a variation of this example embodiment, the first document and the second document are routed to respective ports by a computing device.

In a variation of this example embodiment, the first document and the second document are routed to respective ports automatically.

In a variation of this example embodiment, the first document and the second document are routed to respective ports based on a user input.

In a variation of this example embodiment, the second interpreter is configured to render documents in more than one format of the plurality of formats.

In a variation of this example embodiment, each interpreter of the plurality of interpreters is pre-initialized when the thermal printer is powered on.

In a variation of this example embodiment, an interpreter of the plurality of interpreters is initialized upon receipt of data at a corresponding port of the plurality of ports.

In a variation of this example embodiment, the determining is based at least in part upon parsing metadata associated with the first document and the second document, respectively.

In a variation of this example embodiment, the metadata is contained within a header of a packet which contains at least a portion of the first document or the second document, respectively.

In a variation of this example embodiment, a first port is provided for receiving data in a predetermined format, and a second port is provided for receiving data which requires parsing of metadata.

In another example embodiment, a thermal printer is disclosed that comprises a memory storing a plurality of interpreters, a communication interface, and a processing device programmed to receive a first document from a host via the communication interface, determine the first document has a first format from a plurality of possible formats, select, based upon the first format, a first interpreter from the plurality of interpreters in memory, the first interpreter configured to render the first document for printing, print the first document using the first interpreter, receive a second document from the host via the communication interface, determine the second document has a second format from the plurality of possible formats, select, based upon the second format, a second interpreter from the plurality of interpreters in the memory, the second interpreter configured to render the second document for printing, and print the second document using the second interpreter.

In a variation of this example embodiment, the communication interface includes a plurality of ports, and the processor is programmed to determine the first format and the second format based at least in part upon which of the plurality of ports of the communication interface receives the first document and the second document, respectively.

In a variation of this example embodiment, the first document and the second document are received at respective ports of the plurality of ports based on routing specified by a host.

In a variation of this example embodiment, information received at a port of the plurality of ports for the first document is configured to be routed to the first interpreter of the plurality of interpreters.

In a variation of this example embodiment, each interpreter of the plurality of interpreters is pre-initialized when the thermal printer is powered on.

In a variation of this example embodiment, the processing device is programmed to determine the first format and the second format based at least in part upon parsing metadata associated with the first document and the second document, respectively.

In a variation of this example embodiment, the metadata is contained within a header of a packet which contains at least a portion of the first document or the second document, respectively.

In a variation of this example embodiment, the thermal printer is portable.

In still yet another example embodiment, a non-transitory computer-readable medium storing instructions is disclosed, wherein execution of the instructions by a processing device causes the processing device to receive a first document from a host via a communication interface, determine the first document has a first format from a plurality of possible formats, select, based upon the first format, a first interpreter from a plurality of interpreters in memory, the first interpreter configured to render the first document for printing, print the first document using the first interpreter, receive a second document from the host via the communication interface, determine the second document has a second format from the plurality of possible formats, select, based upon the second format, a second interpreter from the plurality of interpreters in the memory, the second interpreter configured to render the second document for printing, and print the second document using the second interpreter.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
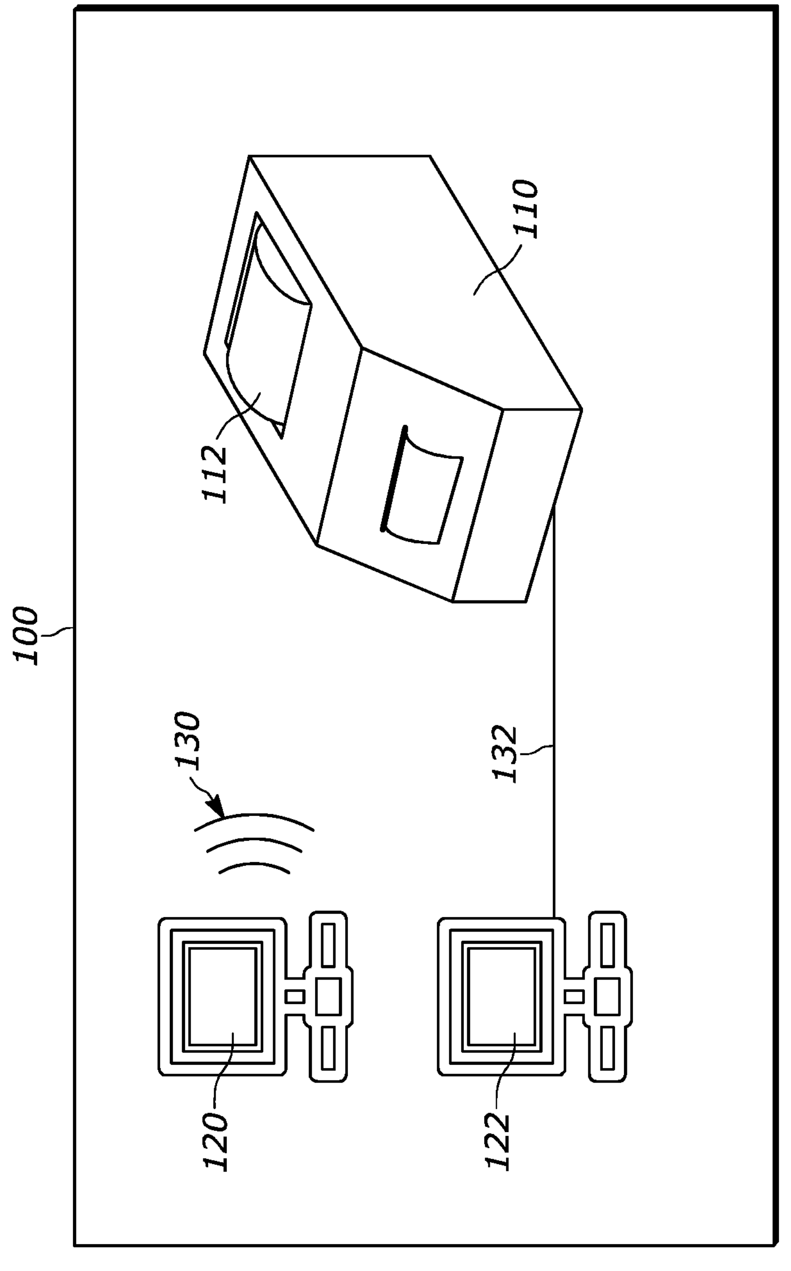
FIG. 1 illustrates an example network containing a first host, a second host, and a media processing device, according to embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Methods, systems, and devices are provided for receiving and rendering documents in predetermined formats via corresponding interpreters. Media processing devices face a number of compatibility challenges when operating in real-world use cases. In particular, many disparate document formats exist, and this can cause problems when trying to process documents of differing formats (e.g. from different applications). Many media processing devices solve this problem by offloading the task of processing different formats to an external device such as a host or a server, and are simply configured to process documents in a single native format (e.g. using a single interpreter). This simplifies the media processing device, but relies upon the host or server to maintain compatibility, which cannot be assumed in all cases. Additionally, in implementations where multiple hosts communicate with a single media processing device, computational efforts may be needlessly duplicated in schemes where hosts are responsible for ensuring format compatibility.

To remedy the above issues, embodiments of the present disclosure are configured to receive documents at a media processing device in several possible and disparate formats. This necessitates that embodiments of the present disclosure be able to differentiate between documents of different formats. One way to achieve this contemplated herein is that of receiving documents of differing formats at differing ports. By directing documents received at a given port to a given interpreter selected from several possible interpreters, the media processing device can maintain a relatively low computational overhead while still accepting multiple formats. This can require the host or server to maintain a degree of awareness of the formats of documents and the configuration of the media processing device. An alternative embodiment inspects metadata of a received document to determine a format of the document, then sends the document to the appropriate interpreter selected from several possible interpreters based upon that determination. This presents a tradeoff where questions of formatting may be increasingly abstracted away from the host at the expense of increased complexity and computational intensity at the media processing device. Another alternative embodiment may combine the use of ports and the metadata to select the appropriate interpreter from the possible interpreters. For example, a first designated port can be specified for documents that are compatible with a first interpreter and a second designated port can use the metadata to determine which of the interpreters is compatible with a document received via the second designated port.

FIG. 1 illustrates an example network 100 containing a first host 120, a second host 122, and a media processing device 110, according to embodiments of the present disclosure. The first host 120 sends wireless communications 130 to the media processing device 110, which is illustrated here as a thermal printer with a roll of media 112. Similarly, the second host 122 sends wired communications 132 to the media processing device 110. The wireless communications 130 and the wired communications 132 may contain documents which may be transmitted in a single packet or may be broken up into packets (e.g. depending on a size of the document). The first host 120 and the second host 122 may communicate indirectly with the media processing device 110, sending the wireless communications 130 or the wired communications 132 via one or more servers, network switches, or other devices. The wireless communications 130 and wired communications 132 may include packets (see FIG. 3 and FIG. 4). The first host 120 and the second host 122 may be computing devices originating print jobs.

The documents may be in any format, including but not limited to Portable Document Format (PDF), Zebra Programming Language (ZPL), Printer Control Language (PCL), Eltron Programming Language (EPL), Extensible Markup Language (XML), Epson Standard Code for Point of Sale (ESC/POS), derivatives thereof, or any other format commonly received at media processing devices. The media processing device may be a printer, a thermal printer, an indicia decoder, a radio frequency identification encoder, a display controller, a combination thereof, and/or any other device likely to receive media and perform computational processes on that media.

Figure 2:
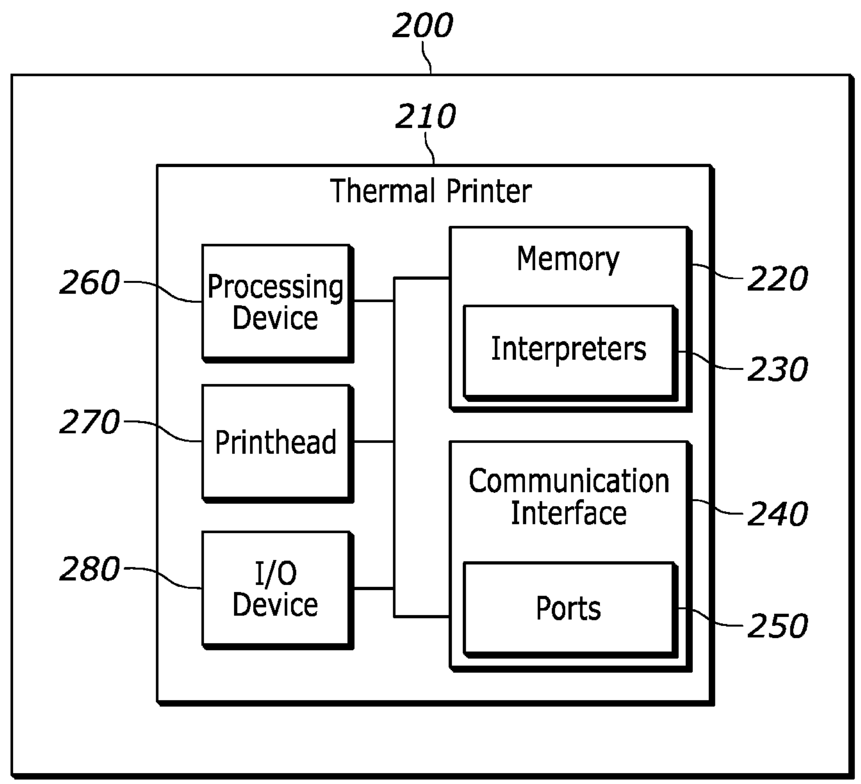
FIG. 2 illustrates an example system with a thermal printer, according to embodiments of the present disclosure.

FIG. 2 illustrates an example system 200 with a thermal printer 210, according to embodiments of the present disclosure. The thermal printer 210 has a memory 220 containing interpreters 230 configured to render documents received at ports 250 of a communication interface 240 for printing by a printhead 270. A processing device 260 in communication with the memory 220 and the communication interface 240 executes the interpreters 230 to render the documents. Input/output (I/O) devices 280, such as user interface components like buttons and/or displays, facilitate interaction between the thermal printer 210 and a user.

Upon receiving a document at a port of the possible ports 250 of the communication interface 240, the processing device 260 may direct the document to an interpreter selected from the possible interpreters 230. Each of the interpreters 230 may be configured to render documents of one or more formats for printing, and an interpreter selected from the possible interpreters 230 may be employed to render a document based upon a format of that document. Each port of the possible ports 250 may be configured to receive documents of one or more formats to the exclusion of other possible formats, and may be paired with an interpreter selected from the possible interpreters 230, such that a document received at a given one of the ports 250 is always directed to the interpreter to which the port is paired. Ensuring that a document of a given format is directed to a proper one of the ports 250 may be a responsibility of a host originating a request that the printer 210 print the document or a server relaying the request to print the document.

Once a document is received by the printer 210 and directed to a selected interpreter from the possible interpreters 230, the processing device 260, via the selected one of the interpreters 230, may proceed to render the document in the form of instructions for the printhead 270. In doing so, the printhead 270 may be made to reproduce the document in a physical medium (e.g., on the media 112 shown in FIG. 1). This port-to-interpreter-to-printhead pipeline allows for a variety of document formats to be supported by the printer 210 that otherwise would only be able to reproduce documents of, for example, a native format.

Figure 3:
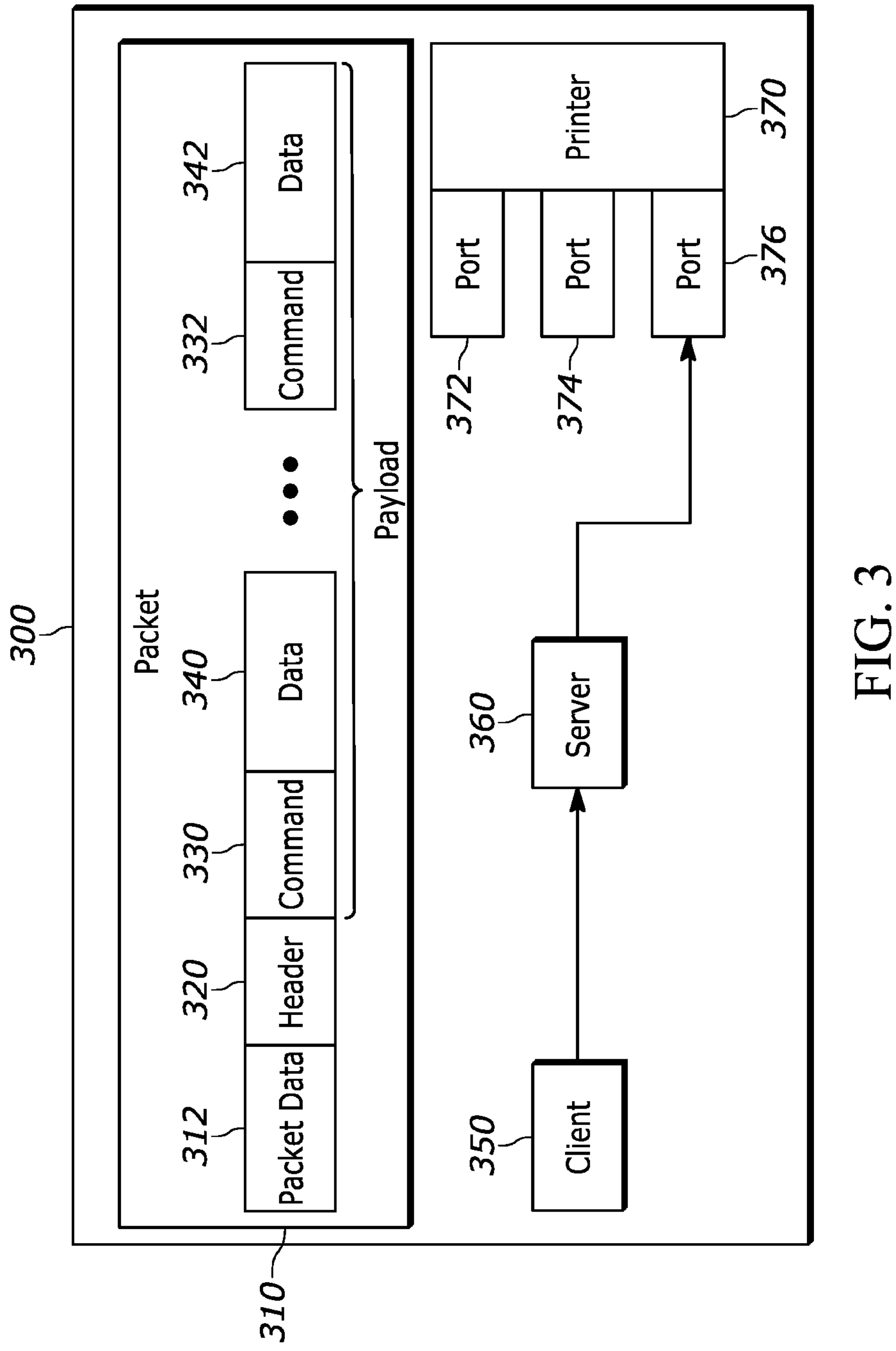
FIG. 3 illustrates an example system with a packet and a network path of the packet, according to embodiments of the present disclosure.
Figure 4:
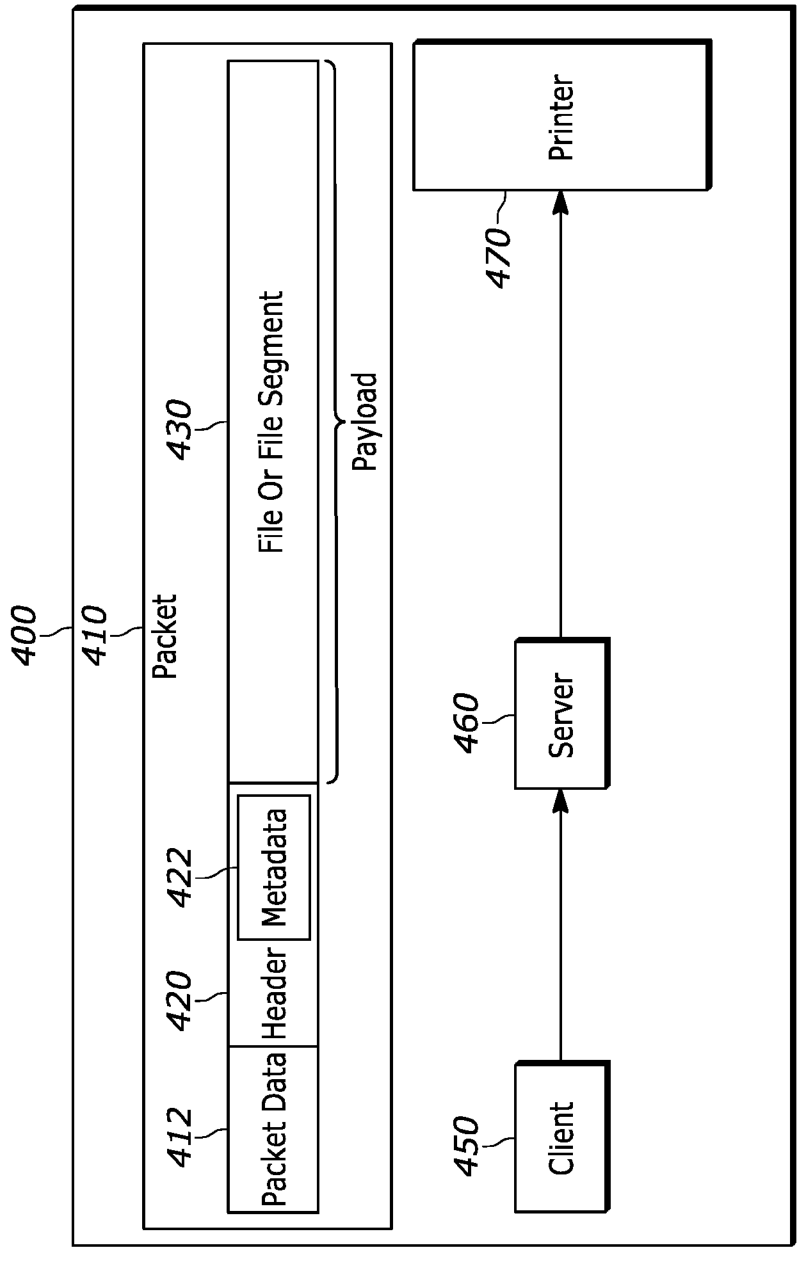
FIG. 4 illustrates an example system with a packet with metadata and a network path of the packet, according to embodiments of the present disclosure.

FIG. 3 illustrates an example system 300 with a packet 310 and a network path of the packet 310, according to embodiments of the present disclosure. The packet 310 may contain packet data 312, a header 320, and a payload including a first command 330 and a second command 332 along with first data 340 and second data 342. The packet data 312 may be networking protocol data, including but not limited to a Transmission Control Protocol (TCP) segment, a User Datagram Protocol (UDP) segment, an Internet Protocol (IP) segment, a Stream Control Transmission Protocol (SCTP) segment, any other segment associated with the network or transport layers of the network stack, or combinations thereof. The header 320 may contain information about the document including but not limited to a document identifier or name, a sequence number of the packet 310 within a series of packets conveying the document, a format of the document, a date and/or time of the document's creation, a date and/or time that the packet 310 was last edited, any other information about the document, or combinations thereof. The payload may include the first command 330 and associated first data 340, where the first command 330 may instruct an interpreter (see FIG. 2) to render the associated first data 340 in a first position on a physical medium such as the media 112 illustrated in FIG. 1. Likewise, the second command 332 may instruct the interpreter to render the second data 342 in a second position on the physical medium. Alternatively, the packet 310 may include a file or file segment as a payload (similar to what is depicted in FIG. 4), rather than the command-and-data arrangement illustrated in FIG. 3. In such an embodiment, the packet may be processed in a substantially similar way to what is described herein.

The packet 310 is sent from a client or host 350 to a printer 370 via a server 360. The printer 370 may be configured to receive documents of a first format (e.g. PDF) at a first port 372, documents of a second format (e.g. ZPL) at a second port 374, and documents of a third format and a fourth format (e.g. EPL and XML) at a third port 376. The client or host 350, when sending the packet 310 as part of a document transfer, may determine that the document is in the fourth format (e.g. XML) and thus should be routed to the third port 376. In one example, the client or host 350 can determine the format based on an application on the client or host 350 within which the document is opened, consumed, and/or processed. The client or host 350 may then send the packet 310 to the server 360, which may inspect routing information supplied by the client or host 350 (which may be contained in the packet data 312) and forwards the packet 310 to the third port 376. The printer 370 will then process the packet 310 with an interpreter associated with the third port 376. In some embodiments, the client or host 350 may instead provide an indication of format to the server 360 (possibly in the header 320) which the server 360 may use to determine to which port the packet 310 should be routed. In some embodiments the server 360 may be omitted, with the client or host 350 sending the packet 310 directly or indirectly to the third port 376.

FIG. 4 illustrates an example system 400 with a packet 410 with metadata 422 and a network path of the packet 410, according to embodiments of the present disclosure. The packet 410 includes packet data 412, a header 420 containing the metadata 422, and a payload which includes a file or file segment 430. The metadata 422 may include an indication of a format of a document associated with the packet 410, a size or length of the document, other information about the document, or combinations thereof. The file or file segment 430 may include data needed to replicate the document, and may include one or more commands for rendering the data in a particular position on a physical medium.

The network path of the packet 410 may include a client 450 sending the packet 410 to a printer 470, which may be a thermal printer. A server 460 may serve as an intermediary, forwarding the packet 410 to the printer 470 when the server 460 receives the packet 410 from the client 450. Upon receiving the packet 410 from the server 460, directly from the client 450, or indirectly from the client 450, the printer 470 may extract the metadata 422 from the packet 410 and inspect the metadata 422 to determine a format of the document. Once the format of the document is determined, the printer 470 may retrieve an interpreter corresponding to that format from memory and execute the interpreter to process the payload 430 of the packet 410. The interpreter may then render the document for printing.

The metadata 422 may be added to the packet 410 by the client 450 when creating the packet 410. In embodiments that include the server 460, the server may be configured to determine a format of the document or receive the metadata 422 from the client 450 separately from the packet 410, add the metadata 422 to the packet 410, then send an updated version of the packet 410 to the printer 470. It will be appreciated that a desirable feature of the system of FIG. 4 is that neither the printer 470, the client 450, nor the server 460 is required to parse instructions from the payload to determine a format of the document. This saves time and energy and reduces a complexity of the printer 470. In some embodiments, the printers 370 and/or 470 can include a combination of methods for determining the interpreter to select from the possible interpreters based on the port that receives the packet 310 and/or the packet 410 and based on metadata included in the packet 310 and/or the packet 410.

Figure 5:
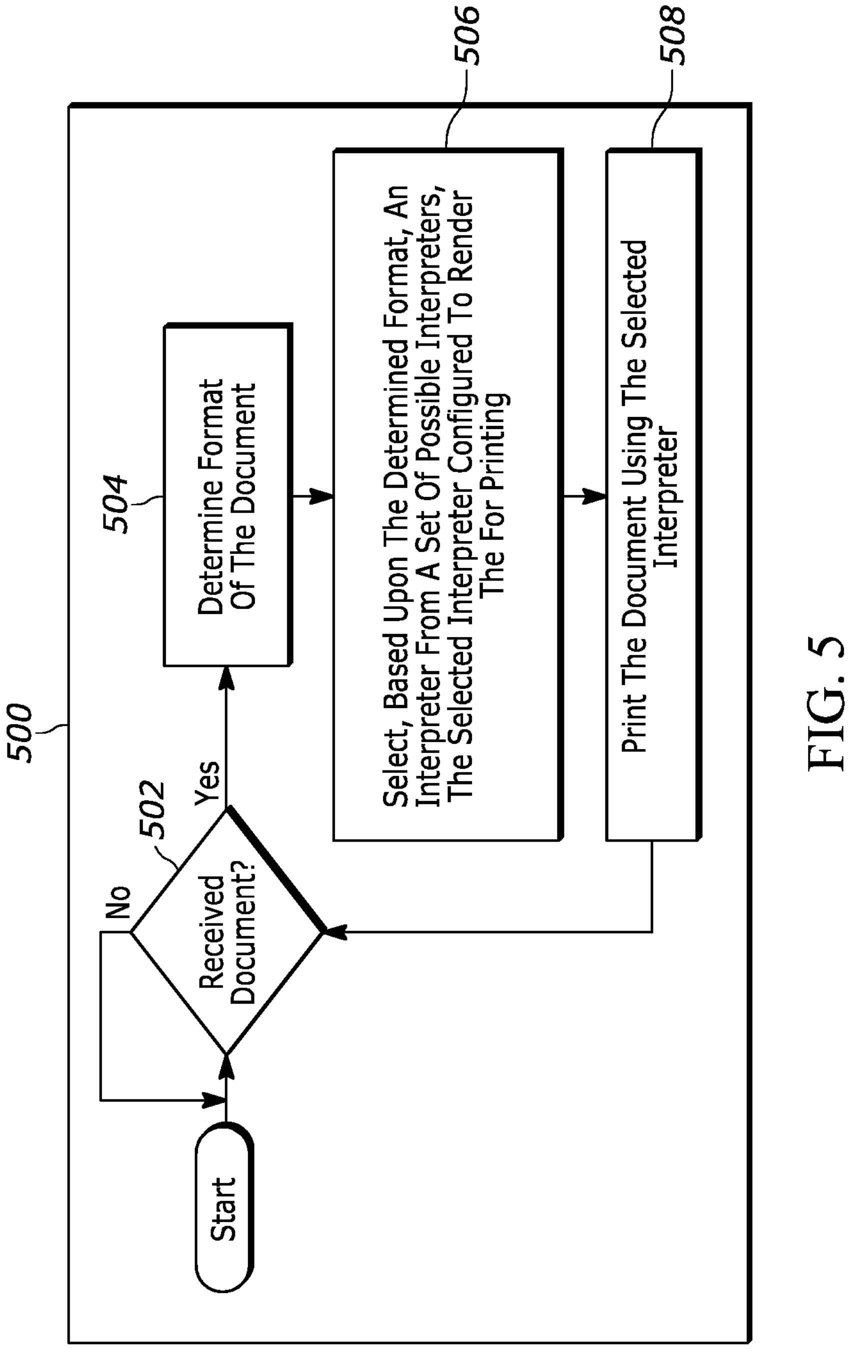
FIG. 5 illustrates an example method for printing a document, according to embodiments of the present disclosure.

FIG. 5 illustrates an example method 500 for printing a document, according to embodiments of the present disclosure. It will be appreciated that the method 500 is presented with a high degree of abstraction, and that particular implementations of the method 500 may differ from that which is presented herein. In particular, additional steps not described herein may be included.

At block 502, an example media processing device determines whether a document has been received at the media processing device. For example, a thermal printer 210 may operate in a standby mode awaiting receipt of a document for printing. When no document has been received, the method 500 repeats or waits at block 502. When a packet comprising all or part of the document has been received, the method 500 proceeds to block 504.

At block 504, the example media processing device determines a format of the document. In a first example, a printer 370 receives the document at a port 376 of a plurality of ports. The printer 370 may be pre-configured to expect to receive a packet 310 containing document data in a predetermined format at each port of the plurality of ports, and the port 376 may, for example, be configured to receive packets containing data in XML format. The printer 370 can thus conclude that the document is in XML format and proceed to block 506.

In a second example, a printer 470 receives a packet 410 containing all or part of the document at a port of the printer 470. The printer 470 may inspect a header 420 of the packet 410 to extract metadata 422 about the document. The metadata 422 may include an indication of the format of the document which the printer 470 may rely upon when determining the format of the document. For example, the metadata 422 may include a numerical value indicating that the document is in ESC/POS format. Once the format of the document has been extracted from the metadata 422, the printer 370 may proceed to block 506.

At block 506, the example media processing device selects, based upon the format determined at block 504, an interpreter from a possible set of interpreters. The selected interpreter may be configured to render the document for printing. For example, the media processing device may retrieve the selected interpreter from memory and a processing device 260 of the media processing device may execute the interpreter. In the first example, the printer 370 routes the packet 310, along with other packets received at the port 376, to an interpreter configured to render documents in XML format for printing. The interpreter may be configured to accept documents of one or more additional formats, which may be received at the port 376 or may be received at one or more additional ports of the printer 370. The interpreter may be pre-initialized in a memory 220 of the printer 370 so that the processing device 260 of the printer can execute the interpreter to begin processing packets immediately upon receipt. Alternatively, the printer 370 may initialize the selected interpreter for execution by the processing device 260 responsive to receipt of the packet 310.

In the second example, the printer 470 selects an interpreter configured to render documents in ESC/POS format for printing. As with the first example, the selected interpreter may be configured to accept documents of one or more additional formats. The selected interpreter may be pre-initialized in a memory 220 of the printer 470 so that the processing device 260 of the printer can execute the interpreter to begin processing packets immediately upon receipt. Alternatively, the printer 470 may initialize the selected interpreter for execution by the processing device 260 responsive to a determination that the packet 410 is of the ESC/POS format. In both examples, the method 500 then proceeds to block 508.

At block 508, the media processing device prints the document using the selected interpreter. In both examples, this may involve the execution of the interpreter by the processing device of the printer to render the document from data contained in the packet 310, the packet 410, and/or other associated packets, then sending the rendered document to a printhead 270. The printhead 270 may then recreate the document on a physical medium, such as the media 112 shown in FIG. 1. The physical medium may be paper, thermal paper, a polymer surface (e.g. plastic polyesters, thermoplastic and/or vinyl polymers, such as polypropylene, polyethylene, polyethylene terephthalate, nylon, and/or Tyvek R, and/or any combination thereof), a metal surface, cardboard, cardstock, linerboard, or any other medium on which the document can be rendered.

Figure 6:
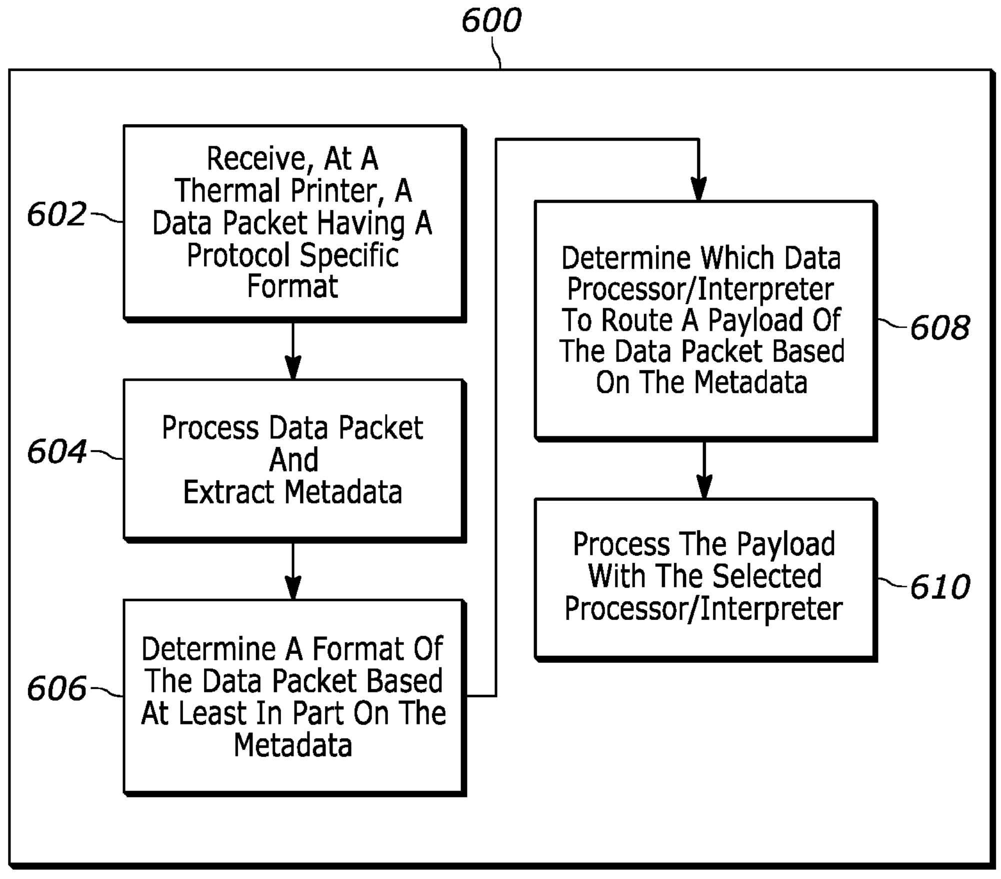
FIG. 6 illustrates an example method for processing a data packet based upon metadata of the data packet, according to embodiments of the present disclosure.

FIG. 6 illustrates an example method 600 for processing a data packet based upon metadata of the data packet, according to embodiments of the present disclosure. It will be appreciated that the method 600 is presented with a high degree of abstraction, and that particular implementations of the method 600 may differ from that which is presented herein. In particular, additional steps not described herein may be included.

At block 602, an example thermal printer receives a data packet having a protocol-specific format. For example, the printer 470 may receive a packet 410 in the EPL format. The packet may contain a payload, including a file or file segment 430 which comprises a whole or part of a document for printing by the printer 470. The packet 410 may also contain a header 420 which provides information about the document. Once the thermal printer receives the packet 410, the method 600 proceeds to block 604.

At block 604, the example thermal printer processes the data packet and extracts metadata. For example, the printer 470 may detect packet data 412 containing a sequence number of the packet 410, indicating that the packet 410 is a first packet of 31 packets. The printer 470 may also detect the header 420 containing metadata 422. The metadata 422 may include, among other information, an indication of a format of the document contained in whole or in part within the payload. Extracting the metadata 422 may involve parsing the header 420. The method 600 proceeds to block 606.

At block 606, the example thermal printer determines a format of the data packet based at least in part on the metadata. For example, the printer 470 may employ the indication of the format of the document within the metadata 422 to determine that the document is in the EPL format, but may also inspect the payload to confirm that the metadata 422 is correct. The method 600 proceeds to block 608.

At block 608, the example thermal printer determines a data processor or interpreter to which to route a payload of the data packet based on the metadata. For example, the printer 470 may route the payload of the packet 410 to an EPL interpreter, as opposed to PDF interpreter, responsive to making the determination of block 606. The EPL interpreter may be pre-initialized or may be initialized upon receipt of the packet 410. The interpreter may be capable of processing payloads of more than one format. For example, the interpreter may be capable of processing EPL and ZPL format documents. In such an embodiment, an indication of format may be directed to the interpreter along with the payload. The method 600 then proceeds to block 610.

At block 610, the example thermal printer processes the payload with the selected data processor or interpreter. For example, the printer 470 may use the selected interpreter to render the document for printing based upon the payload of the packet 410. The printer 470 may continue to send packets to the interpreter, keeping the interpreter active until all packets that make up the document have been received. For example, upon completion of processing the packet 410, the printer 470 or the interpreter may determine that, because the packet 410 is the first of 31, the interpreter should remain active to process subsequent packet payloads. Upon receipt of the last (e.g. the 31st) packet, the printer 470 may terminate execution of the interpreter.

Figure 7:
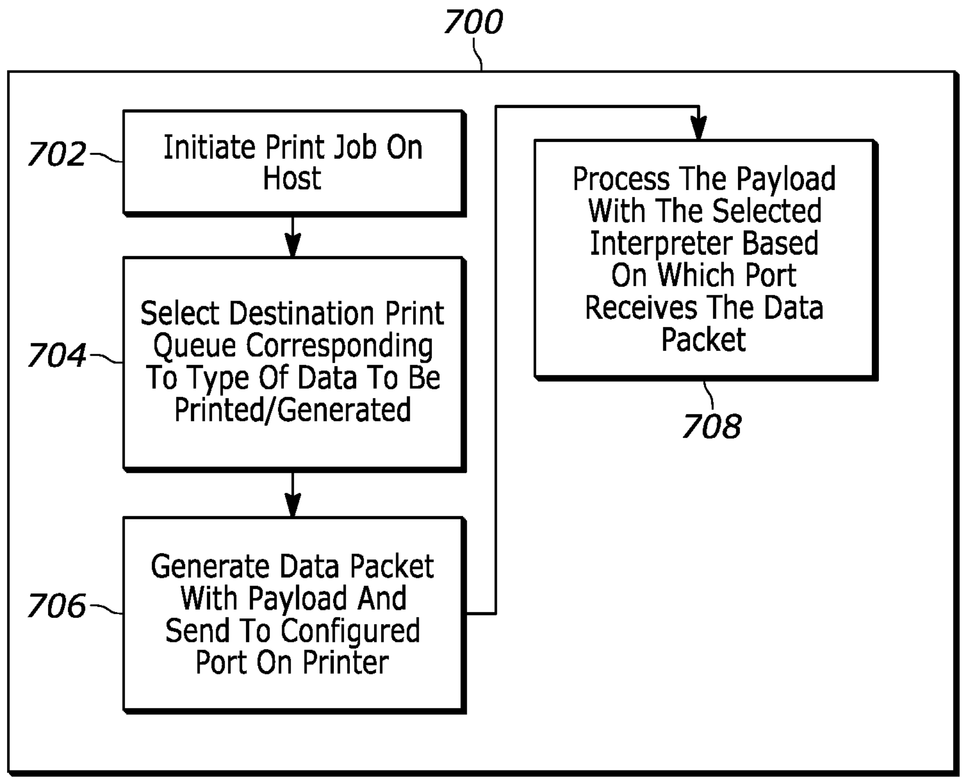
FIG. 7 illustrates an example method for processing a data packet based upon a port at which the data packet was received, according to embodiments of the present disclosure.

FIG. 7 illustrates an example method 700 for processing a data packet based upon a port at which the data packet was received, according to embodiments of the present disclosure. It will be appreciated that the method 700 is presented with a high degree of abstraction, and that particular implementations of the method 700 may differ from that which is presented herein. In particular, additional steps not described herein may be included.

At block 702, an example host initiates a print job. For example, a user of a computer client 350 (the host) may instruct the client 350 to print, via a printer 370, a document. The client 350 may contact a server 360 or the printer 370 to confirm that the printer 370 is ready and available. The method 700 then proceeds to block 704.

At block 704, the example host selects a destination print queue (e.g. via a user interface of the client 350) corresponding to a type of data to be printed or generated. Alternatively, an application within which the document is being opened, processed, rendered, etc., can automatically select the appropriate destination print queue. For example, the client 350 may determine that the document is being exported in PDF format. The printer 370 may be configured to receive documents of PDF format at a queue accessed by a third port 376 selected from several possible ports. The method 700 then proceeds to block 706.

At block 706, the example host may generate a data packet with a payload and send the data packet to the configured port on a printer. For example, the client 350 may generate a packet 310, containing a payload comprising at least part of the document, and may address the packet 310, along with any subsequent packets needed to convey the document, to the third port 376. The client 350 may then send the packet 310 along with any other packets needed to convey the document to either a server 360 or the third port 376. In embodiments where the client 350 communicates with the server 360 instead of directly communicating with the printer 370, the server 360 may then forward the packet 310 along with any subsequent packets to the printer 370. The method 700 then proceeds to block 708.

At block 708, an example printer processes the payload with an interpreter selected from several possible interpreters based upon which port of the possible ports receives the data packet. For example, the printer 370 may direct packets received at the third port 376 to an interpreter configured to render documents received in PDF format for printing. The interpreter may be one of several interpreters of the printer 370. For example, the printer 370 may execute a first interpreter which is configured to process documents in EPL format, accessed by a first port 372, a second interpreter which is configured to process documents in ZPL format, accessed by a second port 374, and the third interpreter which is configured to process documents in PDF format, accessed by the third port 376. The several interpreters may render documents from respective formats onto a physical medium such as the media 112 shown in FIG. 1 by instructing a printhead 270 to produce markings on the physical medium.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC (s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium." "non-transitory machine-readable medium." and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed:

1. A method, comprising:
- receiving a first document at a thermal printer;
- determining the first document has a first format from a plurality of formats;
- selecting, based upon the first format, a first interpreter from a plurality of interpreters, the first interpreter configured to render the first document for printing;
- receiving a second document at the thermal printer;
- determining the second document has a second format of the plurality of possible formats;
- selecting, based upon the second format, a second interpreter from the plurality of interpreters, the second interpreter configured to render the second document for printing; and
- printing the first document and the second document,
- wherein the determining is based at least in part upon which of a plurality of ports of the thermal printer receives the first document and the second document, respectively.

2. The method of claim 1, wherein the first document and the second document are routed to respective ports by a computing device.

3. The method of claim 1, wherein the first document and the second document are routed to respective ports automatically.

4. The method of claim 1, wherein the first document and the second document are routed to respective ports based on a user input.

5. The method of claim 1, wherein the second interpreter is configured to render documents in more than one format of the plurality of formats.

6. The method of claim 5, wherein each interpreter of the plurality of interpreters is pre-initialized when the thermal printer is powered on.

7. The method of claim 5, wherein an interpreter of the plurality of interpreters is initialized upon receipt of data at a corresponding port of the plurality of ports.

8. The method of claim 1, wherein the determining is based at least in part upon parsing metadata associated with the first document and the second document, respectively.

9. The method of claim 8, wherein the metadata is contained within a header of a packet which contains at least a portion of the first document or the second document, respectively.

10. The method of claim 8, wherein a first port is provided for receiving data in a predetermined format, and a second port is provided for receiving data which requires parsing of metadata.

11. A thermal printer, comprising:
- memory storing a plurality of interpreters;
- a communication interface; and
- a processing device programmed to:
  - receive a first document from a host via the communication interface;
  - determine the first document has a first format from a plurality of possible formats;

select, based upon the first format, a first interpreter from the plurality of interpreters in memory, the first interpreter configured to render the first document for printing;

print the first document using the first interpreter;

receive a second document from the host via the communication interface;

determine the second document has a second format from the plurality of possible formats;

select, based upon the second format, a second interpreter from the plurality of interpreters in the memory, the second interpreter configured to render the second document for printing; and print the second document using the second interpreter, wherein the communication interface includes a plurality of ports, and the processing device is programmed to determine the first format and the second format based at least in part upon which of the plurality of ports of the communication interface receives the first document and the second document, respectively.

12. The thermal printer of claim 11, wherein the first document and the second document are received at respective ports of the plurality of ports based on routing specified by a host.

13. The thermal printer of claim 11, wherein information received at a port of the plurality of ports for the first document is configured to be routed to the first interpreter of the plurality of interpreters.

14. The thermal printer of claim 13, wherein each interpreter of the plurality of interpreters is pre-initialized when the thermal printer is powered on.

15. The thermal printer of claim 11, wherein the processing device is programmed to determine the first format and the second format based at least in part upon parsing metadata associated with the first document and the second document, respectively.

16. The thermal printer of claim 15, wherein the metadata is contained within a header of a packet which contains at least a portion of the first document or the second document, respectively.

17. The thermal printer of claim 11, wherein the thermal printer is portable.

18. A non-transitory computer-readable medium storing instructions which, when executed by a processing device, cause the processing device to:

receive a first document from a host via a communication interface;

determine the first document has a first format from a plurality of possible formats;

select, based upon the first format, a first interpreter from a plurality of interpreters in memory, the first interpreter configured to render the first document for printing;

print the first document using the first interpreter;

receive a second document from the host via the communication interface;

determine the second document has a second format from the plurality of possible formats;

select, based upon the second format, a second interpreter from the plurality of interpreters in the memory, the second interpreter configured to render the second document for printing; and print the second document using the second interpreter, wherein the determining is based at least in part upon which of a plurality of ports of the thermal printer receives the first document and the second document, respectively.

19. A thermal printer, comprising:

memory storing a plurality of interpreters;

a communication interface including a first port and a second port, the first port is provided for receiving data in a first format and the second port is provided for receiving data in a different format from a plurality of possible formats; and a processing device programmed to:

receive a first document from a host via the first port of the communication interface;

determine the first document has the first format from a plurality of possible formats in response to receiving the first document via the first port;

select, based upon the first format, a first interpreter from the plurality of interpreters in memory, the first interpreter configured to render the first document for printing;

print the first document using the first interpreter;

receive a second document from the host via the second port of the communication interface;

parse metadata of the second document to determine which of the plurality of possible formats corresponds to the second document in response to receiving the second document via the second port;

determine the second document has a second format from the plurality of possible formats based on the metadata of the second document;

select, based upon the second format, a second interpreter from the plurality of interpreters in the memory, the second interpreter configured to render the second document for printing; and print the second document using the second interpreter.

* * * * *